Patented Mar. 1, 1949

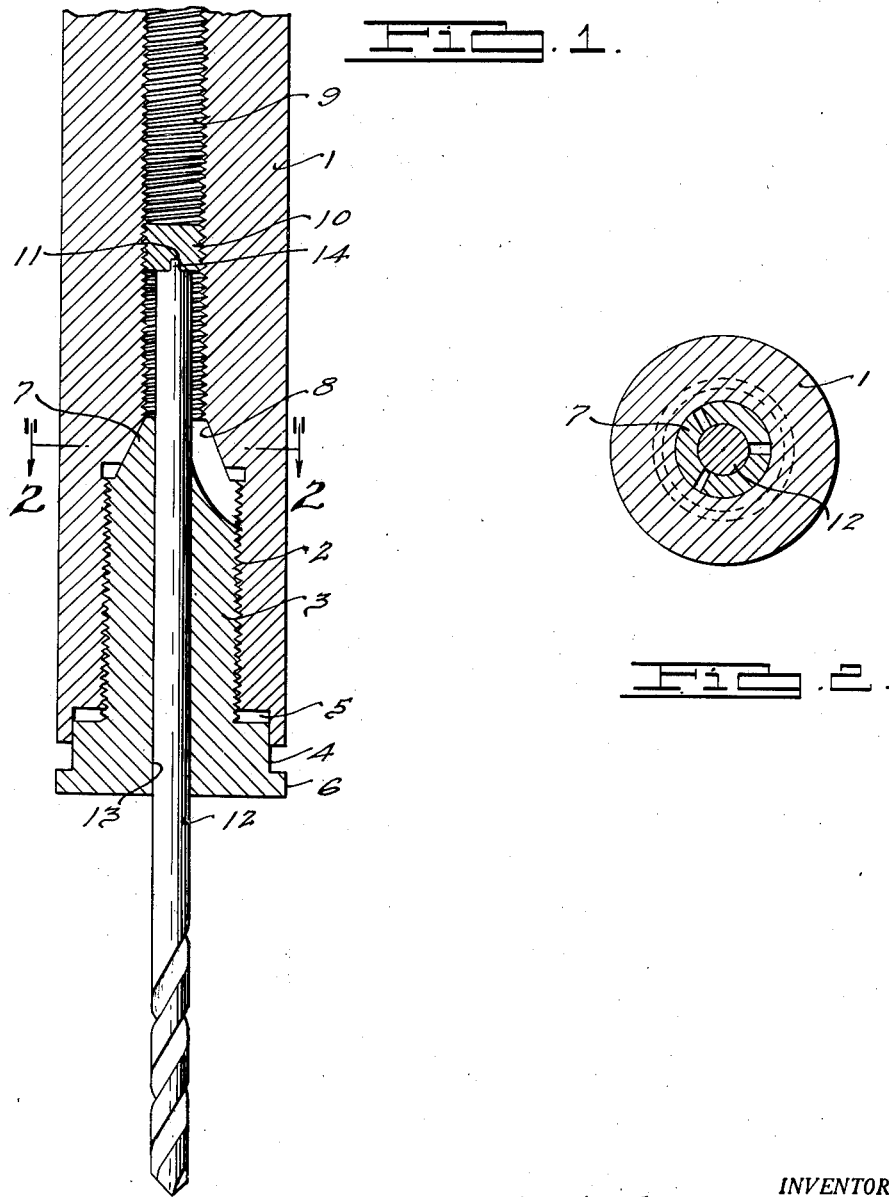

2,463,354

UNITED STATES PATENT OFFICE 2,463,354

DRILL HOLDER

Maurice J. Brown, deceased, late of West Dearborn, Mich., by Thurlo G. Masters, Detroit, and Oscar B. Wiley, Dearborn, Mich., administrators Application February 23, 1946, Serial No. 649,684

4 Claims. (Cl. 279—41)

This invention relates generally to drill holders and has more particular relation to an extremely simple, novel, and improved type of drill holder which embodies certain advantages not heretofore obtained.

The primary object of the present invention is to provide a drill holder for positively driving a drill, which holder may be adjusted to accommodate drills of various lengths.

Another object of the invention is to provide apparatus of the character mentioned which is extremely simple and may be readily constructed at low cost.

A further object of the invention is to provide a construction to thus positively drive a drill which has a minimum of movable parts.

Many other and further objects, advantages, and features of the present invention, will become clearly apparent from the following specification, when considered in conjunction with the drawings forming a part thereof, and the claims hereinafter set forth.

In the drawings:

Fig. 1 is a vertical, sectional view through a drill holder embodying the improvements of the present invention;

Fig. 2 is a transverse, sectional view taken on line 2—2 of Fig. 1, illustrating the arrangement of the axial slots in the collet.

With more particular reference to the drawings, the drill holder of this invention provides a sleeve member 1 which may be integrally a part of the driven spindle of a drill press, or secured thereto in a suitable manner, and driven in the usual manner by a driving means associated with a drill press.

In the lower end of this sleeve 1, a tapped opening 2 is provided to threadably receive bushing 3. Such bushing 3 has, on one end thereof, an annular shoulder 4 adapted to be received within an annular opening 5 provided therefor in sleeve 1. Another annular shoulder 6 on bushing 3 may be grasped with the operator's hand, or with wrench means, to effect rotation of such bushing.

This rotation brings tapered collet 7, on bushing 3, into engagement with the surface of the conical opening 8, extending between the top of lower opening 2 and the bottom of upper, tapped opening 9 within sleeve 1. Inasmuch as contractible jaws are formed in collet 7 in the usual way, that is to say; by sawing axial slots therein, such jaws contract as tapered collet 7 contacts the surface of conical opening 8.

Within the tapped opening 9, at the top of sleeve 1, plug 10 is threadably positioned to be rotatably moved, as will hereinafter become more clear, to predetermined location. Such plug has transverse slot 11 in its lower surface.

Thus, when drill 12 is introduced into the opening 13 centrally of bushing 3, the tang or key 14 on the upper end of the drill shank may be placed in slot 11 of plug 10. With the tang 14 so positioned, plug 10 may be rotatably adjusted until a desired amount of the drill remains exteriorly of the holder. At this time, bushing 3 is tightened, bringing tapered collet 7 into contact with conical surface 8. As stated in the foregoing, this serves to cause the jaws of such collet to contract. Such contraction of the jaws causes the same to frictionally hold drill 12 with tang 14 in slot 11.

The thread in opening 9 of sleeve 1, is formed opposite hand to the direction of rotation of sleeve 1. For example, the usual direction of rotation of a drill press is right-hand, in this case, the threads in opening 9 would be left hand. Consequently, when drill 12 is cutting, plug 10 imparts to such drill a positive rotative movement by virtue of tang or key 14 being rigidly held within slot 11 due to the gripping of the jaws on collet 7. Any tendency of the drill to slip as it cuts is immediately checked by plug 10 occasioned by the opposite hand threading of opening 9.

As stated previously, it is possible, simply by shifting plug 10 before collet 7 is tightened against conical surface 8, to accommodate various lengths of drills. This desirable feature eliminates the necessity for providing bushings or other protective means in a surrounding relationship to the drill to prevent bending thereof while drilling. With the apparatus of this invention, it is necessary to allow only a length of drill exteriorly of the holder sufficiently long to do the work.

What is claimed is:

1. In combination, a right hand drill, transverse key means formed on the shank end of said drill, a drill holder including a sleeve having a left-hand threaded axial opening therein, a plug threadably received in said opening having complemental transverse key means formed in one end thereof for engaging said drill key means, and gripping means in said sleeve adapted to frictionally support said drill in a keyed relation with said plug.

2. In combination, a right-hand drill, transverse key means formed on the shank end of said drill, a drill holder including a sleeve having a left-hand threaded axial opening therein, a plug disposed in said opening and having complemental transverse key means formed in one end thereof for engaging said drill key means, and gripping means in said sleeve adapted to frictionally support said drill in a keyed relationship with said plug, said plug being axially adjustable in said opening to accommodate various lengths of drills, and said sleeve being adapted to be driven in a drill press of the right-hand rotating type for causing said plug to insure rotation of said drill with said sleeve.

3. A drill holder having an outer sleeve adapted to be driven in a drill press of the right-hand rotating type, a left-hand threaded opening in the upper end of said sleeve, a right-hand threaded opening in the lower end of said sleeve, a conical surface between the bottom of the upper opening and the top of the lower opening, a plug threadably received in the upper opening, said plug having transverse key means on the lower surface thereof adapted to engage complemental key means on the upper end of a righthand drill, an externally threaded bushing having an axial bore therethrough adapted to receive the shank of the drill, said bushing being threadably received in said lower opening, and an integral tapered collet formed on the upper end of said bushing adapted to mate with said conical surface, said collet being axially slotted to form contractable jaw means adapted to frictionally support the drill in keyed relation with said plug when the bushing is tightened to bring the collet against said conical surface.

4. A drill holder having an outer sleeve adapted to be driven in a drill press of the right-hand rotating type, a left-hand threaded opening in the upper end of said sleeve, a right-hand threaded opening in the lower end of said sleeve which is greater in diameter than the upper opening, a conical opening connecting said upper and lower threaded openings, a plug threadably received in the upper opening, said plug having a transverse slot in the lower surface thereof adapted to engage a complemental transverse tang formed on the upper end of a right-hand drill, an externally threaded bushing having an axial bore therethrough adapted to receive the shank of said drill, said bushing being threadably received in said lower opening, and an integral tapered collet formed on the upper end of said bushing adapted to mate with said conical surface, said collet being slotted to form contractable jaw means adapted to frictionally support the drill in keyed relation with said plug when the bushing is tightened to bring the collet against said conical surface.

THURLO G. MASTERS,
OSCAR B. WILEY,
*Administrators of the Estate of Maurice J. Brown, Deceased.*

REFERENCES CITED

The following references are of record in the file of this patent:

UNITED STATES PATENTS

| Number | Name | Date |
|---|---|---|
| 184,210 | How | Nov. 7, 1876 |
| 339,595 | Stone | Apr. 6, 1896 |
| 670,533 | Byrd | Mar. 26, 1901 |
| 964,922 | Lewthwaite | July 19, 1910 |
| 1,416,102 | Lusk | May 16, 1922 |
| 2,038,602 | Redinger | Apr. 28, 1936 |

FOREIGN PATENTS

| Number | Country | Date |
|---|---|---|
| 631 | Great Britain | Jan. 12, 1905 |